Patented Feb. 9, 1932

1,844,394

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

REDUCTION OF UNSATURATED ACID COMPOUNDS

No Drawing. Application filed April 20, 1929. Serial No. 356,883.

This invention relates to processes for reducing unsaturated acid compounds and particularly compounds containing the acid radical corresponding to maleic and fumaric acid.

In the past maleic and fumaric acids and their salts have been reduced to the corresponding succinic acid compounds by means of metals as catalysts, for example palladium, nickel, etc. The metal catalysts hitherto used have been open to a number of disadvantages, one of which being that it is difficult to separate the finely divided metal from the succinic acid produced. Reuse of the catalyst has also been difficult and considerable losses of catalytic material takes place. The present invention is based on the reduction of maleic acid or fumaric acid or a mixture or their salts or other compounds, such as esters, in the presence of catalysts in which the catalytic metal element is present in the form of a salt or salt-like body, simple or complex, for example base exchange bodies such as zeolites, non-siliceous base exchange bodies and their derivatives. The reaction may be carried out in the liquid phase in the case of the free acids or their salts or other compounds or, if desired, in the vapor phase especially when the esters are used. The corresponding succinic acid compounds are obtained and may either be used as such or succinic acid may be produced therefrom by the usual methods. The salts or complex compounds, such as base exchange bodies or their derivatives in which the catalytic element or elements are chemically combined do not tend to form colloidal solutions which cannot be separated from the products with ease; they show as great or in many cases greater catalytic activity than the metals themselves and the operation of the process is greatly simplified by their use. Losses of catalytic material are also greatly diminished. The catalytic elements such as nickel, iron, cobalt, copper, zinc, cadmium, etc. may be used in the form of simple salts which are not reduced by hydrogen, for example chromates, borates, aluminates, titanates, zirconates, etc., salts of metal acids of the fifth and sixth groups of the periodic system in so far as they are resistant to hydrogen, and the like. In some of these compounds the acid radical is not catalytically active; in others, such as, for example, chromates, tungstates, aluminates, etc., the acid radical serves to tone the effectiveness of the base united with it and permits a very smooth reaction with good yields. The salts may be used as such or a very desirable contact mass may be produced by incorporating the salts into various carriers such as, for example, kieselguhr, silica gel, powdered base exchange bodies and other derivatives, asbestos fibers, and the like.

Example 1

100 parts of sodium maleate are dissolved in 100 parts of water and 20 parts of a pulverized complex nickel catalyst is added, the catalyst being prepared as follows:

An ordinary sodium aluminate silicate zeolite is leached with dilute hydrochloric acid until the exchangeable base is removed. If desired, the leaching may be carried on to the point at which part or all of the aluminum oxide is also removed. This carrier is impregnated with nickel chromate by first impregnating with sodium bichromate then treating with a solution of nickel nitrate. The amount of nickel chromate introduced should be about 20% of the weight of the carrier.

The impregnated leached zeolite is then washed carefully, dried at 80° C. in a reducing atmosphere, pulverized and mixed with the sodium maleate solution. The solution is maintained at 80° C. and hydrogen is pumped at a pressure of about 2 atmospheres until no more hydrogen is absorbed and until titration of a sample with permanganate shows no more bleaching. A suction filter is then inserted into the solution which is then sucked, acidified, and the succinic acid produced is recovered in a state of high purity. The traces of succinic acid remaining in solution may be recovered in any suitable manner, thus for example, the mother liquor may be evaporated to dryness and the solid product which contains the sodium salt of the acid used in the acidification and the remaining succinic acid is subjected to esterification, the succinic esters being distilled off from the non-volatile salts.

Instead of impregnating a leached zeolite with nickel chromate, a corresponding amount of nickel tungstate may be incorporated. It should be noticed that the carrier is not inert unless all of the aluminum oxide has been leached out since the aluminum oxide tones the catalyst.

Instead of using a leached aluminum zeolite, a nickel zeolite may be used in which the nickel is present in the non-exchangeable nucleus. Copper, cobalt or iron zeolites may also be used as can non-silicious base exchange bodies, such as the reaction product of sodium aluminate and nickel ammonium nitrate under reaction conditions substantially neutral or alkaline to phenolphthalein.

Instead of using sodium maleate, a mixture of sodium maleate and sodium fumarate may be used, but in this case it will be noted that the reaction proceeds more slowly, a longer time is taken as the fumarates do not reduce as readily as the maleates.

*Example 2*

A methyl ester of maleic acid or fumaric acid or a mixture is vaporized in a stream of hydrogen in the ratio of 2 grams of ester to 40 liters of hydrogen, and the mixture is then passed over a catalyst which is prepared by spraying hot, etched 8–10 mesh quartz granules with a suspension of nickel molybdate, the temperature of the quartz granules being sufficiently high so that the water in the suspension is vaporized immediately on contact, producing a very uniform film. The proportion of nickel molybdate to carrier should be 20 grams to 200 cc. The catalytic zone is maintained at 250–300° C., good yields of methyl succinate being obtained which may advantageously be condensed from the exhaust gases and the hydrogen recirculated, the recirculation permits the use of an excess of hydrogen which is very desirable for best results. Instead of the methyl ester, of course, other esters, such as ethyl, propyl, benzyl and the like may be used.

The esters of succinic acid may be used as such, for example, as plasticizers or may be hydrolyzed to produce succinic acid.

Throughout the specification and in the claims the term "permutogenetic" covers base exchange bodies, silicious or non-silicious, the products obtained by the acid leaching of these base exchange bodies and the salt-like bodies obtained by the reaction of these base exchange bodies with compounds the acid radicals of which are capable of reacting with the base exchange bodies to produce products which show most of the properties of salts. When used in the claims, the term "permutogenetic" will have no other meaning.

What is claimed as new is:

1. A method of hydrogenating a compound containing an acid radical of the formula, $C_2H_2(CO_2)_2$, which comprises subjecting the compound to the action of a hydrogen containing gas in the presence of a catalyst containing a reduction catalyst metal chemically combined in a form in which it is not substantially reduced by hydrogen at low temperatures during the reaction.

2. A method of hydrogenating a compound containing an acid radical of the formula, $C_2H_2(CO_2)_2$, which comprises subjecting the compound to the action of a hydrogen containing gas in the presence of a metal belonging to the group nickel, iron, cobalt, copper chemically combined in a form in which it is not substantially reduced by hydrogen at low temperatures during the reaction.

3. A method of hydrogenating a compound containing an acid radical of the formula, $C_2H_2(CO_2)_2$, which comprises subjecting the compound to the action of a hydrogen containing gas in the presence of nickel chemically combined in a form in which it is not substantially reduced by hydrogen at low temperature during the reaction.

4. A method of hydrogenating a compound containing an acid radical of the formula, $C_2H_2(CO_2)_2$, which comprises subjecting the compound to the action of a hydrogen containing gas in the presence of a compound of nickel with a metal acid of the 5th and 6th groups of the periodic system.

5. A method of hydrogenating a compound containing an acid radical of the formula, $C_2H_2(CO_2)_2$, which comprises subjecting the compound to the action of a hydrogen containing gas in the presence of a compound of nickel chromate.

6. A method according to claim 1 in which the compound is an ester.

7. A method according to claim 1 in which the compound is an ester and the reduction takes place in the vapor phase.

8. A method according to claim 1 in which the contact mass contains a permutogenetic body.

9. A method according to claim 2 in which the contact mass contains a permutogenetic body.

10. A method according to claim 3 in which the contact mass contains a permutogenetic body.

11. A method according to claim 4 in which the contact mass contains a permutogenetic body.

Signed at Pittsburgh, Pennsylvania, this 17th day of April, 1929.

ALPHONS O. JAEGER.